(12) United States Patent
Lee et al.

(10) Patent No.: US 7,740,444 B2
(45) Date of Patent: Jun. 22, 2010

(54) METHODS AND SYSTEM FOR COOLING INTEGRAL TURBINE SHROUD ASSEMBLIES

(75) Inventors: Ching-Pang Lee, Cincinnati, OH (US); James Harvey Laflen, Loveland, OH (US); Dustin Alfred Placke, Cincinnati, OH (US); George Elliott Moore, Lebanon, OH (US); Katherine Jaynetorrence Andersen, Cincinnati, OH (US); Daniel Verner Jones, Maineville, OH (US)

(73) Assignee: General Electric Company, Schenectady, NY (US)

( * ) Notice: Subject to any disclaimer, the term of this patent is extended or adjusted under 35 U.S.C. 154(b) by 729 days.

(21) Appl. No.: 11/565,387

(22) Filed: Nov. 30, 2006

(65) Prior Publication Data
US 2008/0131264 A1    Jun. 5, 2008

(51) Int. Cl.
*F01D 25/12* (2006.01)
(52) U.S. Cl. .............. 415/173.1; 415/116; 415/213.1; 415/1
(58) Field of Classification Search ............... 415/1, 415/173.1, 116, 209.2, 209.3, 213.1
See application file for complete search history.

(56) References Cited

U.S. PATENT DOCUMENTS

| | | | |
|---|---|---|---|
| 4,573,865 A * | 3/1986 | Hsia et al. ................. 415/115 |
| 4,949,545 A | 8/1990 | Shekleton | |
| 5,056,988 A * | 10/1991 | Corsmeier et al. ....... 415/173.2 |
| 5,127,793 A * | 7/1992 | Walker et al. ............... 415/115 |
| 5,217,348 A | 6/1993 | Rup, Jr. et al. | |
| 5,228,828 A * | 7/1993 | Damlis et al. ............ 415/173.2 |
| 5,511,945 A | 4/1996 | Glezer et al. | |
| 5,641,267 A * | 6/1997 | Proctor et al. ............ 415/173.1 |
| 6,340,285 B1 | 1/2002 | Gonyou et al. | |
| 6,354,795 B1 | 3/2002 | White et al. | |
| 6,398,488 B1 | 6/2002 | Solda et al. | |
| 6,431,820 B1 | 8/2002 | Beacock et al. | |
| 6,431,832 B1 | 8/2002 | Glezer et al. | |
| 6,485,255 B1 | 11/2002 | Care et al. | |
| 6,779,597 B2 | 8/2004 | DeMarche et al. | |
| 6,984,100 B2 | 1/2006 | Bunker et al. | |

* cited by examiner

*Primary Examiner*—Ninh H Nguyen
(74) *Attorney, Agent, or Firm*—William Scott Andes, Esq.; Armstrong Teasdale LLP

(57) ABSTRACT

A method for cooling a turbine shroud assembly includes providing a turbine shroud assembly including a shroud segment having a leading edge, a trailing edge and a midsection defined therebetween. A shroud support circumferentially spans and supports the shroud segment. The shroud support includes a forward hanger coupled to the leading edge, a midsection hanger coupled to the midsection and an aft hanger coupled to the trailing edge. An annular shroud ring structure includes a midsection position control ring coupled to the midsection hanger and an aft position control ring coupled to the aft hanger. Cooling air is extracted from a compressor positioned upstream of the turbine shroud assembly. Cooling air is metered through the shroud support directly into only at least one active convection cooling zone defined between the shroud segment and the shroud support while substantially preventing cooling air from entering an inactive convection cooling zone positioned radially outwardly from the at least one active convection cooling zone and defined between the shroud support and the shroud ring structure and between the midsection position control ring and the aft position control ring.

20 Claims, 4 Drawing Sheets

METHODS AND SYSTEM FOR COOLING INTEGRAL TURBINE SHROUD ASSEMBLIES

STATEMENT REGARDING FEDERALLY SPONSORED RESEARCH & DEVELOPMENT

The U.S. Government may have certain rights in this invention pursuant to contract number N00019-04-C-0093.

BACKGROUND OF THE INVENTION

This invention relates generally to gas turbine engines and, more particularly, to methods and systems for cooling integral turbine shroud assemblies.

One known approach to increase the efficiency of gas turbine engines requires raising the turbine operating temperature. However, as operating temperatures are increased, the thermal limits of certain engine components may be exceeded, resulting in reduced service life and/or material failure. Moreover, the increased thermal expansion and contraction of components may adversely affect component clearances and/or component interfitting relationships. Consequently, cooling systems have been incorporated into gas turbine engines to facilitate cooling such components to avoid potentially damaging consequences when exposed to elevated operating temperatures.

It is known to extract, from the main airstream, air from the compressor for cooling purposes. To facilitate maintaining engine operating efficiency, the volume of cooling air extracted is typically limited to only a small percentage of the total main airstream. However, this requires that the cooling air be utilized with the utmost efficiency in order to maintain the temperatures of components within safe limits.

For example, one component that is subjected to high temperatures is the shroud assembly located immediately downstream of the high pressure turbine nozzle extending from the combustor. The shroud assembly extends circumferentially about the rotor of the high pressure turbine and thus defines the outer boundary (flow path) of the main gas stream flowing through the high pressure turbine. Gas turbine engine efficiency is negatively affected by a fluctuation in turbine blade clearance measured between a radially outer surface of the turbine blade and a radially inner surface of the shroud assembly. During transient engine operation, the turbine blade clearance is a function of the relative radial displacements of the turbine rotor blade and the shroud assembly. The turbine rotor blade typically has a larger mass than the stationary shroud system and, thus, during turbine operation, the turbine rotor blade typically has a slower thermal response than the shroud assembly. When the difference in the turbine rotor radial displacement and the shroud assembly radial displacement is too great, the blade clearance is increased, which results in a reduction in engine efficiency.

BRIEF DESCRIPTION OF THE INVENTION

In one aspect, a method for cooling a turbine shroud assembly is provided. The method includes providing a turbine shroud assembly including a shroud segment having a leading edge, a trailing edge and a midsection defined therebetween. A shroud support circumferentially spans and supports the shroud segment. The shroud support includes a forward hanger coupled to the leading edge, a midsection hanger coupled to the midsection and an aft hanger coupled to the trailing edge. An annular shroud ring structure includes a midsection position control ring coupled to the midsection hanger and an aft position control ring coupled to the aft hanger. Cooling air is extracted from a compressor positioned upstream of the turbine shroud assembly. Cooling air is metered through the shroud support directly into only at least one active convection cooling zone defined between the shroud segment and the shroud support.

In another aspect, a turbine shroud assembly for a gas turbine engine is provided. The turbine shroud assembly includes a shroud segment including a leading edge, a trailing edge and a midsection defined therebetween. The shroud segment also includes a forward mounting hook at the leading edge, a midsection mounting hook at the midsection and an aft mounting hook at the trailing edge. A shroud support circumferentially spans and supports the shroud segment. The shroud support includes a forward section, a midsection and an aft section. The forward section forms a forward hanger coupled to the forward mounting hook. The midsection forms a midsection hanger coupled to the midsection mounting hook. The aft section forms an aft hanger coupled to the aft mounting hook. An annular shroud ring structure is configured to support the shroud support. The annular shroud ring structure includes a midsection position control ring coupled to the midsection hanger and an aft position control ring coupled to the aft hanger. A first active convection cooling zone is defined between the shroud segment and the shroud support and between the forward mounting hook and the midsection mounting hook. At least one feed hole extends through the shroud support and is configured to meter a first portion of cooling air into the first active convection cooling zone. A first inactive convection cooling zone is defined between the shroud support and the annular shroud ring structure and between the midsection position control ring and the aft position control ring. The shroud support substantially prevents cooling air from entering the first inactive convection cooling zone.

In another aspect, a turbine shroud cooling system is provided for providing cooling air through a turbine shroud assembly to facilitate cooling the turbine shroud assembly. The turbine shroud assembly includes a shroud segment having a leading edge, a trailing edge and a midsection defined therebetween, and a shroud support circumferentially spanning and supporting the shroud segment. The shroud support includes a forward hanger coupled to the leading edge, a midsection hanger coupled to the midsection and an aft hanger coupled to the trailing edge. The turbine shroud assembly also includes a shroud ring structure including a midsection position control ring coupled to the midsection hanger and an aft position control ring coupled to the aft hanger. The turbine shroud cooling system is configured to direct cooling air into a duct defined at least partially between a high pressure turbine nozzle outer band positioned upstream of the turbine shroud assembly and the shroud ring structure and meter cooling air through the shroud support directly into only at least one active convection cooling zone defined between the shroud segment and the shroud support to facilitate shroud segment cooling.

DETAILED DESCRIPTION OF THE INVENTION

The present invention provides a turbine shroud cooling system for providing high pressure cooling air through a turbine shroud assembly to facilitate cooling the turbine shroud assembly in an efficient and reliable manner. Further, the turbine shroud cooling system facilitates reducing transient displacement of the position control rings for the shroud assembly. More specifically, the turbine shroud cooling system meters cooling air through the shroud assembly while bypassing the low pressure, LP, shroud ring structure to facilitate reducing and/or retarding a shroud segment thermal response during transient engine operation. As a result, transient displacement of the shroud segment is reduced and/or retarded. The reduced and/or retarded shroud segment thermal response facilitates improved turbine blade clearance and turbine engine efficiency.

Although the present invention is described below in reference to its application in connection with cooling a shroud assembly of an aircraft gas turbine, it should be apparent to those skilled in the art and guided by the teachings herein provided that with appropriate modification, the cooling system or assembly of the present invention can also be suitable to facilitate cooling other turbine engine components, such as, but not limited to, the nozzle and/or vane sections.

Figure 1:
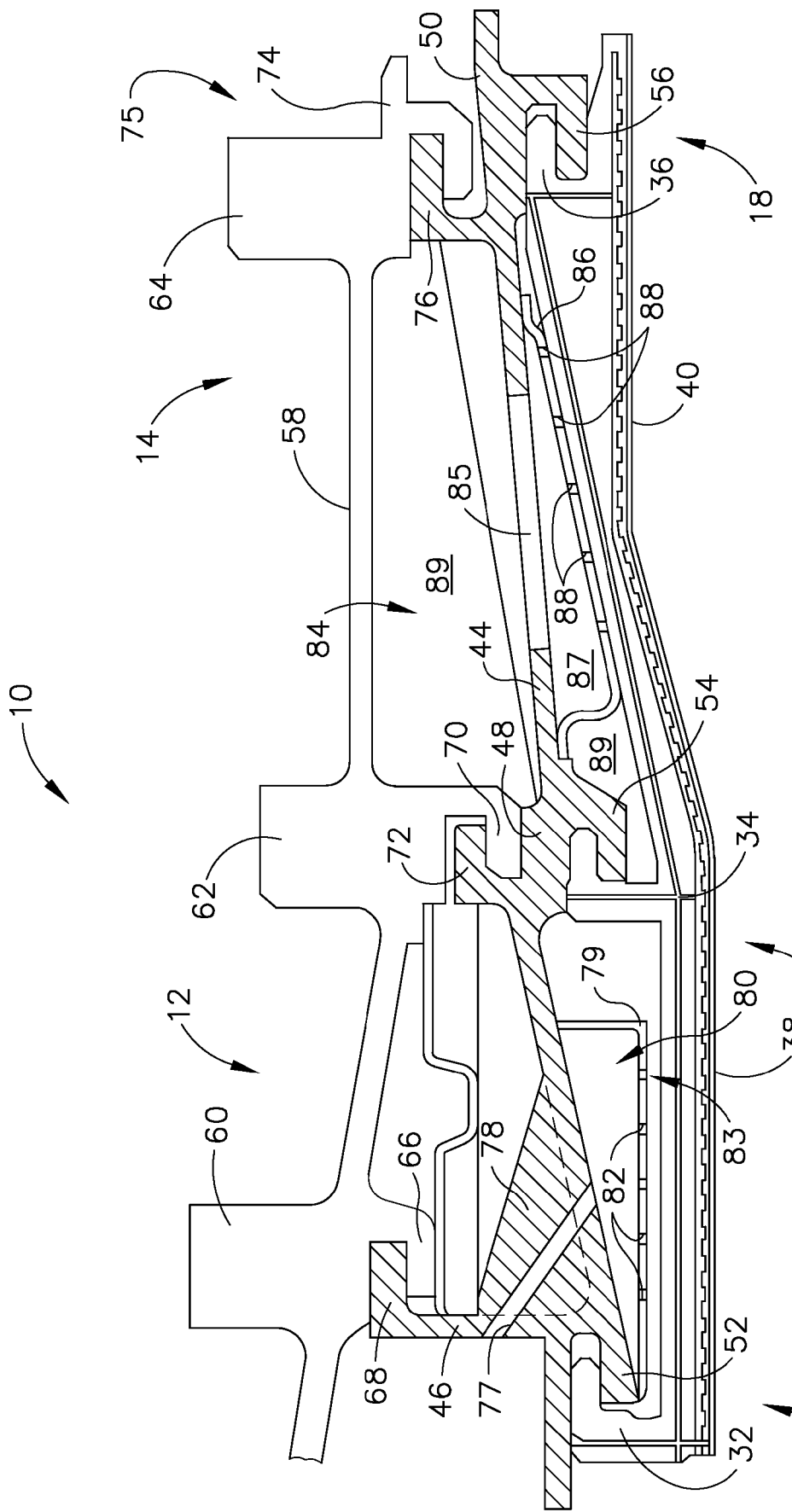
FIG. 1 is a side view of a known shroud assembly for a gas turbine engine.
Figure 2:
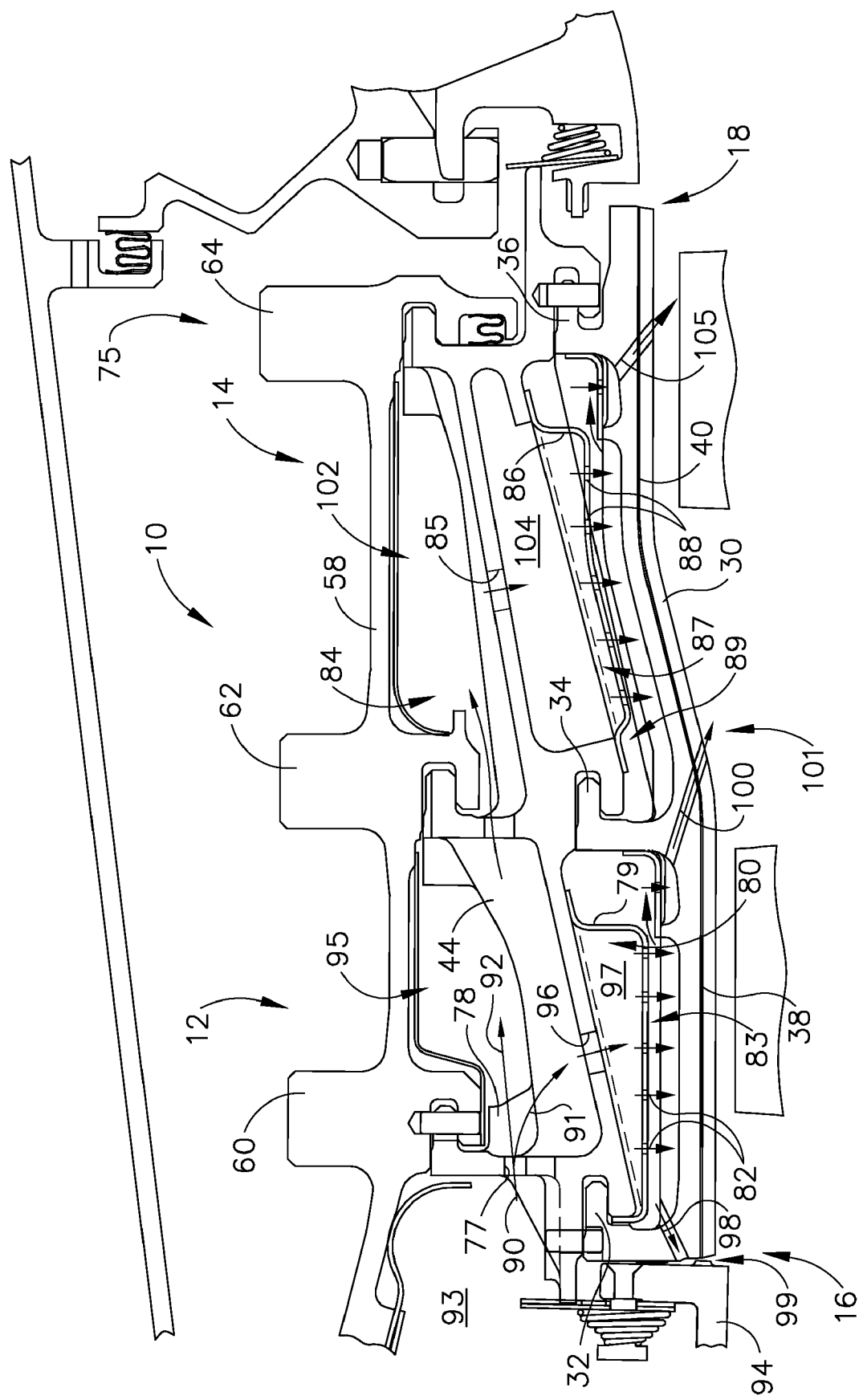
FIG. 2 is a side view of the shroud assembly shown in FIG. 1 schematically illustrating fluid flow through the prior art shroud assembly.

Referring to the drawings, FIGS. 1 and 2 illustrate a known turbine engine cooling assembly in the form of a shroud assembly, generally indicated as 10, for a high pressure turbine section 12 and a low pressure turbine section 14 of a gas turbine engine. Shroud assembly 10 includes turbine engine cooling components in the form of shroud segments 30. Each shroud segment 30 is provided with a forward mounting hook 32 at a circumferential leading edge 16 of shroud segment 30. Shroud segment 30 also has a central mounting hook 34 and an aft mounting hook 36 adjacent to a circumferential trailing edge 18 of shroud segment 30.

A plurality of shroud segments 30 are arranged circumferentially about a turbine rotor blade (not shown) to form a segmented 360° shroud. Shroud segments 30 define an annular clearance between high pressure turbine blades (not shown) and a radially inner surface 38 of a high pressure turbine section of shroud segments 30, and between low pressure turbine blades (not shown) and a radially inner surface 40 of a low pressure turbine section of shroud segment 30. A plurality of segmented shroud supports 44 interconnect shroud segments 30. Each shroud support 44 spans circumferentially and generally supports two adjacent shroud segments 30, but can be appropriately modified to support any suitable number of shroud segments 30. For example, conventional shroud assemblies 10 may include twenty-six (26) shroud segments 30 and thirteen (13) shroud supports 44.

Each shroud support 44 includes a forward section 46, a central section 48 and an aft section 50 that form respective forwardly projecting hangers 52, 54 and 56. Shroud support 44 supports respective shroud segments 30 as a result of mounting hooks 32, 34 and 36 being received by respective hangers 52, 54 and 56 in a tongue-in-groove or hook-in-hanger interconnection.

Each shroud support 44 is further supported by a one-piece, continuous annular shroud ring structure 58. A radial position of each shroud support 44, as well as each shroud segment 30, is closely controlled by three discrete annular position control rings 60, 62, and 64 provided on shroud ring structure 58. Forward position control ring 60 and central position control ring 62 are each formed with respective axially forwardly projecting hangers 66 and 70 that receive respective rearwardly projecting mounting hooks 68 and 72 of forward section 46 and central section 48. Aft position control ring 64 is formed with an axially forwardly projecting hanger 74 that receives rearwardly projecting mounting hook 76 of aft section 50 in a circumferential tongue-in-groove or hook-in-hanger interconnection. Conventional shroud ring structure 58 includes three position control rings 60, 62 and 64 that increase a mass of shroud ring structure 58 to facilitate retarding shroud assembly thermal response during transient engine operation.

To maximize radial support and radial position control provided to each shroud support 44 and, thus, each shroud segment 30, each hanger 66, 70 and 74 is usually in direct axial alignment, i.e., aligned in the same radial plane, with respective position control rings 60, 62 and 64. This alignment increases the rigidity of the entire shroud assembly 10. As shown in FIG. 1, shroud ring structure 58 is bolted to a combustor case (not shown) at an aft end 75 of ring structure 58. Further, as shown in FIG. 1, shroud segment leading edge 16 is cantilevered away from the combustor case interface. As such, forward position control ring 60 and central position control ring 62 are positioned away from the combustor aft flange (not shown), and are thereby divorced from any non-uniform circumferential variations in radial deflection in the combustor case.

The segmented shroud design accommodates the thermal growth imposed by the hostile environment created by the hot flowing exhaust gas. The segmented shroud supports effectively separate the heat conduction path between the high temperature shroud mounting hooks and the position control rings. The position control rings are thus well isolated from the hostile and non-uniform flow path environment.

In the turbine engine cooling assembly of the prior art, high pressure cooling air 90 is extracted from the compressor (not shown). A first portion 91 of high pressure cooling air 90 is fed through a plurality of high pressure turbine section (HPTS) feed holes 77 formed in a boss 78 of shroud support 44. First portion 91 of high pressure cooling air 90 then impinges against a pan-shaped HPTS impingement baffle 79 attached to shroud support 44, thus defining an upper HPTS cavity or plenum 80. First portion 91 of high pressure cooling air 90 is then feed through a plurality of perforations 82 formed in impingement baffle 79 as cooling air into a lower HPTS cavity or plenum 83. A second portion 92 of high pressure cooling air 90 is fed through an active convection cooling zone 84 and through a plurality of low pressure turbine section (LPTS) feed holes 85 formed in shroud support 44. Second portion 92 of high pressure cooling air 90 impinges against a pan-shaped LPTS impingement baffle 86 attached to shroud support 44, thus defining an upper LPTS cavity or plenum 87. Second portion 92 of high pressure cooling air 90 is then channeled through perforations 88 formed in impingement baffle 86 as cooling air into a lower LPTS cavity or plenum 89.

As shown in FIG. 2, initially high pressure cooling air 90 is directed into a duct 93 defined at least partially between a high pressure turbine nozzle outer band 94 and forward position control ring 60. High pressure cooling air 90 is separated into first portion 91 and second portion 92 as high pressure cooling air 90 is directed into a first region 95 defined at least partially between shroud support 44 and shroud ring structure 58 and between forward position control ring 60 and central position control ring 62 to facilitate cooling high pressure turbine section 12. First portion 91 of high pressure cooling air 90 is metered through at least one suitable metering hole 96 into a second region 97 at least partially defining plenum 80 and plenum 83 to facilitate shroud segment impingement cooling in high pressure turbine section 12. Spent impingement cooling air exits shroud segment 30 through shroud segment leading edge holes 98 to facilitate purging a gap 99 defined between high pressure turbine nozzle outer band 94 and shroud segment 30 and/or through a row of film cooling holes 100 defined at a trailing end 101 of high pressure turbine section 12 to facilitate film cooling inner surface 40 of low pressure turbine section 14.

Second portion 92 of high pressure cooling air 90 is directed into a third region 102 at least partially defining active convection cooling zone 84 between shroud support 44 and shroud ring structure 58 and between central position control ring 62 and aft position control ring 64 to facilitate cooling low pressure turbine section 14. Second portion 92 of high pressure cooling air 90 is metered into a fourth region 104 at least partially defining plenum 87 and plenum 89 to facilitate shroud segment impingement cooling in low pressure turbine section 14. Spent impingement cooling air exits shroud segment 30 through shroud segment trailing edge holes 105. In this conventional flow path, regions 95 and 102 are actively cooled and have a relatively quick thermal response during transient engine operation. This relatively quick thermal response causes quick transient displacement of position control rings 60, 62 and/or 64.

Figure 3:
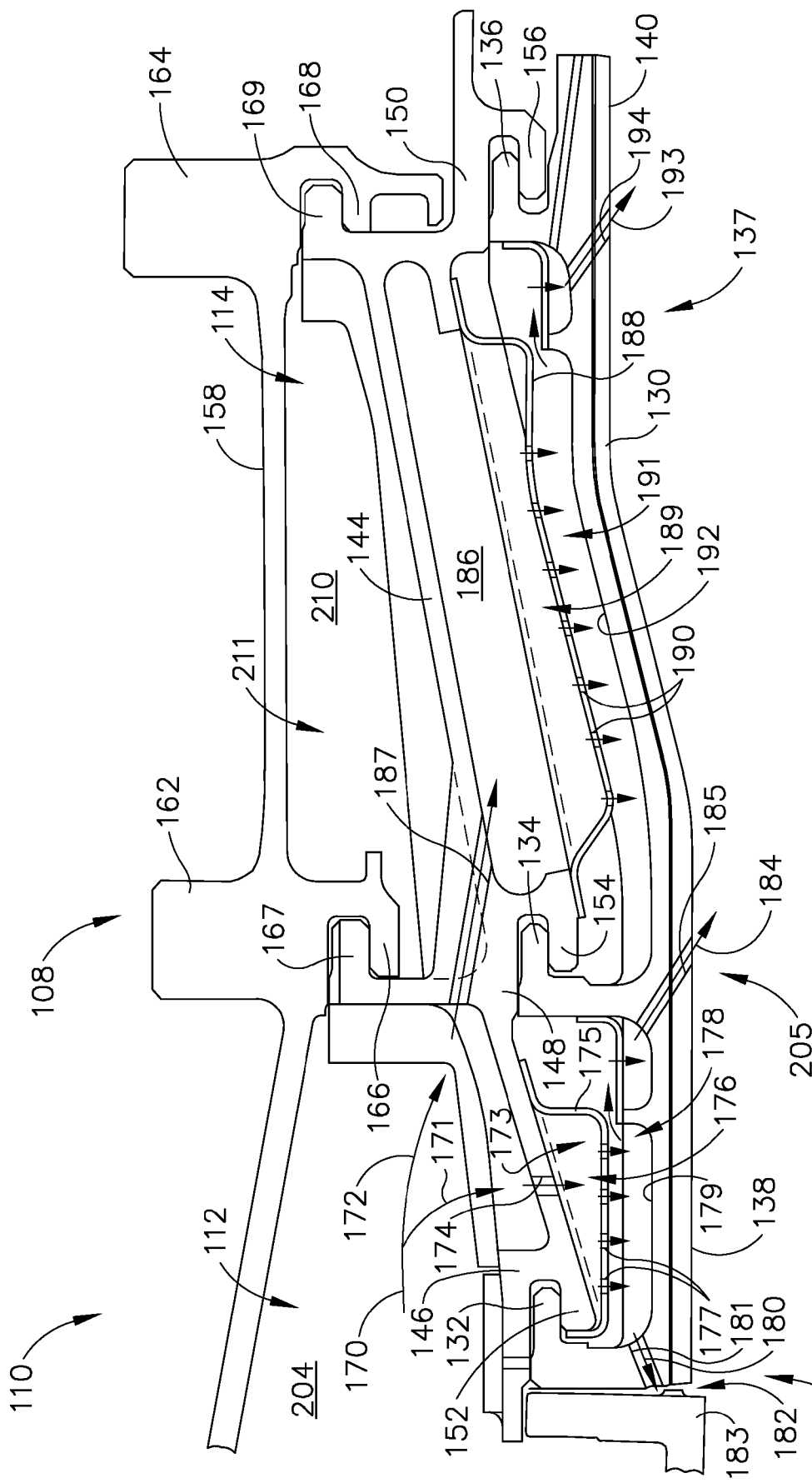
FIG. 3 is a side view of an exemplary shroud assembly schematically illustrating high pressure cooling air flow through the shroud assembly.
Figure 4:
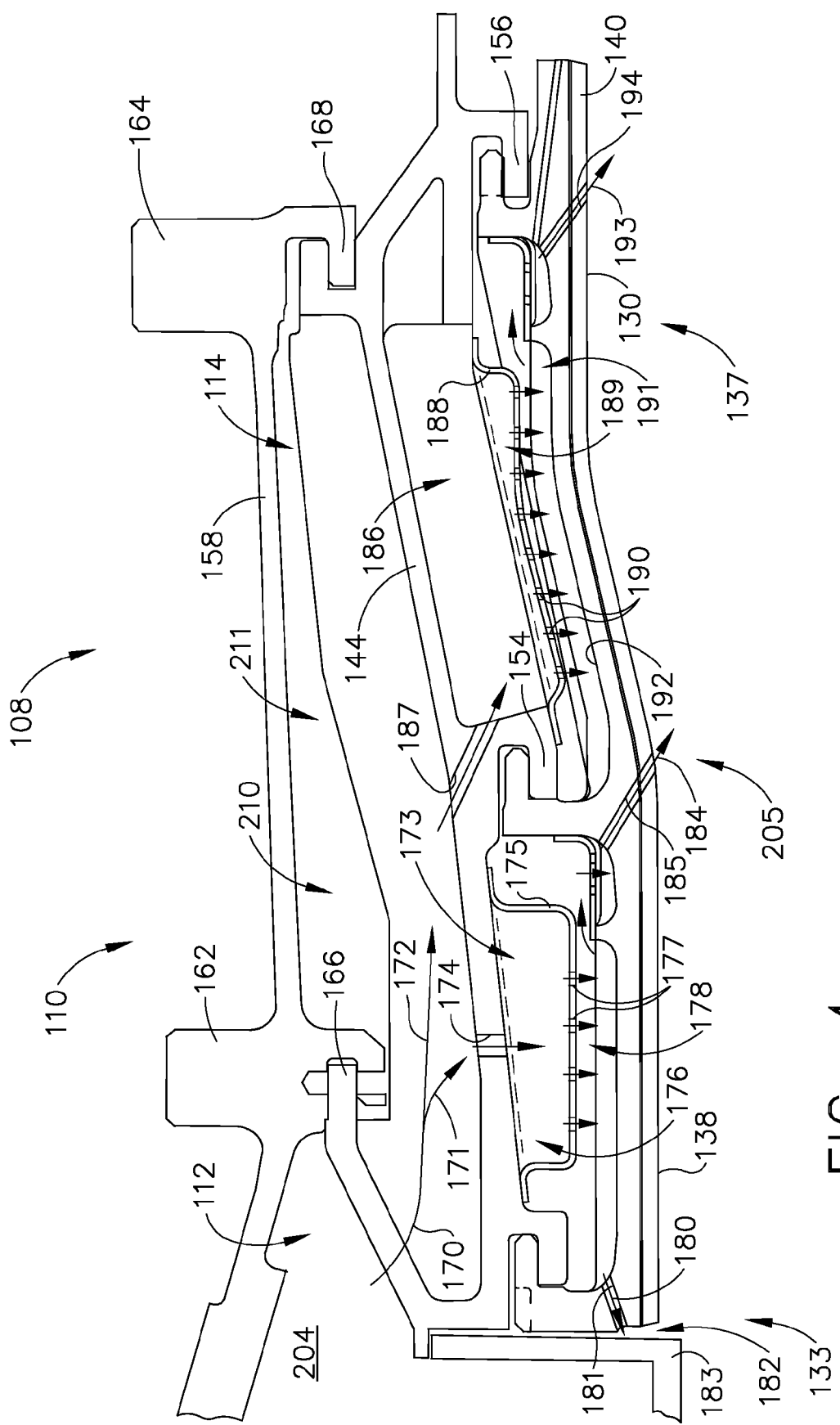
FIG. 4 is a side view of an alternative shroud assembly schematically illustrating high pressure cooling air flow through the shroud assembly.

FIG. 3 is a side view of an exemplary shroud assembly schematically illustrating high pressure cooling air flow through the shroud assembly. FIG. 4 is a side view of an alternative shroud assembly schematically illustrating high pressure cooling air flow through the shroud assembly. To facilitate controlling shroud assembly thermal response and/or shroud assembly displacement during transient engine operation, in the exemplary embodiment, a turbine engine cooling assembly 108 includes a shroud assembly, generally indicated as 110, for a high pressure turbine section 112 and a low pressure turbine section 114 of a gas turbine engine. It should be apparent to those skilled in the art and guided by the teachings herein provided that turbine engine cooling assembly 108 may be suitable to facilitate cooling other sections of the gas turbine engine, such as, but not limited to, a nozzle section and/or a vane section.

Shroud assembly 110 includes turbine engine cooling components in the form of shroud segments 130. Each shroud segment 130 includes a forward mounting hook 132 at a circumferential leading edge 133 of shroud segment 130. Shroud segment 130 also includes a midsection mounting hook 134 and an aft mounting hook 136 adjacent to a circumferential trailing edge 137 of shroud segment 130.

A plurality of shroud segments 130 are arranged circumferentially in a generally known fashion to form an annular segmented shroud. Shroud segments 130 define an annular clearance between high pressure turbine blades (not shown) and a radially inner surface 138 of a high pressure turbine section of shroud segments 130, and between low pressure turbine blades (not shown) and a radially inner surface 140 of a low pressure turbine section of shroud segment 130. A plurality of segmented shroud supports 144 interconnect shroud segments 130. Each shroud support 144 circumferentially spans and supports adjacent shroud segments 130. In alternative embodiments, shroud supports 144 are modified to support any suitable number of shroud segments 130 less than or greater than two shroud segments 130. In the exemplary embodiment, shroud assembly 110 includes twenty-six (26) shroud segments 130 and thirteen (13) shroud supports 144, although any suitable number of shroud segments 130 and/or shroud supports 144 may be utilized in alternative embodiments.

Each shroud support 144 includes a forward section 146, a midsection 148 and an aft section 150 that form respective forwardly projecting hangers 152, 154 and 156. Mounting hooks 132, 134 and 136 are received by cooperating hangers 152, 154 and 156, respectively, in tongue-in-groove, or hook-in-hanger, interconnections such that shroud support 144 supports respective shroud segments 130.

Shroud assembly 110 includes an annular shroud ring structure 158 that in turn maintains shroud supports 144 in a desired position. In one embodiment, shroud ring structure 158 is a one-piece, continuous annular shroud ring structure. A radial position of each shroud support 144, as well as of each shroud segment 130, is closely controlled by only two annular position control rings 162 and 164 formed on shroud ring structure 158. In contrast to conventional shroud ring structures, to facilitate reducing or limiting a weight of shroud assembly 110, shroud ring structure 158 includes only two position control rings 162 and 164. A midsection position control ring 162 includes an axially forwardly projecting hanger 166 that receives and/or cooperates with a rearwardly projecting mounting hook 167 formed by support structure midsection 148 in a first circumferential tongue-in-groove or hook-in-hanger interconnection. An aft position control ring 164 includes an axially forwardly projecting hanger 168 that receives and/or cooperates with a rearwardly projecting mounting hook 169 of support structure aft section 150 in second circumferential tongue-in-groove or hook-in-hanger interconnection.

In the exemplary embodiment, hangers 166 and 168 are in direct axial alignment, i.e., aligned generally in the same radial plane, with respective hanger 154 and hanger 156 to facilitate maximizing the radial support and/or radial position control provided to shroud support 144 and, thus, corresponding shroud segments 130. This alignment orientation facilitates increasing the rigidity of the entire shroud support assembly. In an alternative embodiment, shown in FIG. 4, hanger 166 and/or hanger 168 are in an offset axial alignment, i.e., not aligned generally in the same radial plane, with respective hanger 154 and hanger 156. In the exemplary embodiment, shroud ring structure 158 is bolted to the combustor case (not shown) at an aft end of shroud ring structure 158. Shroud ring structure 158 is cantilevered away from leading edge 133 at the combustor case interface. As such, midsection position control ring 162 is positioned several inches away from the combustor aft flange (not shown), and is thereby divorced from any non-uniform circumferential variations in radial deflection in the combustor case.

In the exemplary embodiment, high pressure cooling air 170 is extracted from a compressor (not shown) positioned upstream of shroud assembly 110. A first portion 171 of high pressure cooling air 170 extracted from the compressor facilitates cooling high pressure turbine section 112. A second portion 172 of high pressure cooling air 170 extracted from the compressor facilitates cooling low pressure turbine section 114. Referring further to FIG. 3, directional arrows corresponding to first portion 171 and second portion 172 illustrate at least a portion of a flow path of first portion 171 of high pressure cooling air 170 through a high pressure turbine section active convection cooling zone 173 and second portion 172 of high pressure cooling air 170 through a low pressure turbine section active convection cooling zone 186 (described below), respectively.

In this embodiment, first portion 171 of high pressure cooling air 170 is metered into a first or high pressure turbine section active convection cooling zone 173. More specifically, first portion 171 of high pressure cooling air 170 is metered through at least one high pressure turbine section (HPTS) feed hole 174 defined in shroud support 144. First portion 171 of high pressure cooling air 170 impinges against a pan-shaped HPTS impingement baffle 175 positioned within high pressure turbine section active convection cooling zone 173. Baffle 175 is coupled to shroud support 144 and thus at least partially defines an upper HPTS cavity or plenum 176. First portion 171 of high pressure cooling air 170 is then metered through a plurality of perforations 177 formed in impingement baffle 175 as cooling air into a lower HPTS cavity or plenum 178 defined in shroud segment 130, wherein the cooling air impinges against a backside 179 of shroud segment 130. A portion, such as spent impingement cooling air 180, of high pressure cooling air exits plenum 178 through a plurality of forwardly directed cooling holes 181 defined at, or near, shroud segment leading edge 133 configured to facilitate purging a gap 182 defined between high pressure turbine nozzle outer band 183 and leading edge 133. A portion 184 of high pressure cooling air is metered through a plurality of rearwardly directed cooling holes 185 defined in shroud segment 130 to facilitate film cooling inner surface 138 and/or 140. Spent impingement cooling air 180 of high pressure cooling air exiting cooling holes 181 facilitates preventing or limiting hot gas injection or recirculation into shroud assembly 110 at leading edge 133.

Second portion 172 of high pressure cooling air 170 extracted from the compressor facilitates cooling low pressure turbine section 114. In this embodiment, second portion 172 of high pressure cooling air 170 is metered into a second or low pressure turbine section active convection cooling zone 186. More specifically, second portion 172 of high pressure cooling air 170 is metered through at least one low pressure turbine feed hole 187 defined in shroud support 144. Second portion 172 of high pressure cooling air 170 impinges against a pan-shaped low pressure turbine section (LPTS) impingement baffle 188 positioned within low pressure turbine section active convection cooling zone 186. Baffle 188 is coupled to shroud support 144, and thus at least partially defines an upper LPTS cavity or plenum 189. Second portion 172 of high pressure cooling air 170 is then metered through perforations 190 defined in impingement baffle 188 and into a lower LPTS cavity or plenum 191 wherein high pressure cooling air impinges against a backside 192 of shroud segment 130. The cooling air exits plenum 191 through a plurality of rearwardly directed cooling holes 194 defined through shroud segment 130, to facilitate film cooling a radially inner surface 140 of trailing edge 137 of shroud segment 130 downstream.

As shown in FIG. 3, high pressure cooling air 170 is initially directed into a duct 204 defined at least partially between high pressure turbine nozzle outer band 183 and the portion of shroud ring structure 158 forming midsection position control ring 162. High pressure cooling air 170 is separated within duct 204 into first portion 171, and into second portion 172 as high pressure cooling air 170 is directed through duct 204. First portion 171 of high pressure cooling air 170 is metered through HPTS feed holes 174 into active convection cooling zone 173 and into plenum 178 to facilitate impingement cooling in high pressure turbine section 112. Spent impingement cooling air exits shroud segment 130 through shroud segment leading edge cooling holes 181 to facilitate purging gap 182 defined between high pressure turbine nozzle outer band 183 and shroud segment 130, and/or through cooling holes 185 defined at a trailing end 205 of high pressure turbine section 112 to facilitate film cooling inner surface 140 of shroud segment 130.

Second portion 172 of high pressure cooling air 170 is directed into second active convection cooling zone 186 that is defined at least partially between shroud support 144 and shroud segment 130, and between midsection position control ring 162 and aft position control ring 164. Second portion 172 of high pressure cooling air 170 facilitates cooling low pressure turbine section 114. In one embodiment, second portion 172 of high pressure cooling air 170 is metered through a plurality of low pressure turbine feed holes 187 defined in shroud support 144. More specifically, second portion 172 of high pressure cooling air 170 is metered directly into active convection cooling zone 186 to facilitate shroud segment impingement cooling in low pressure turbine section 114, such that cooling air bypasses third region 210 defining an inactive convection cooling zone 211 between shroud support 144 and shroud ring structure 158, and between midsection position control ring 162 and aft position control ring 164. Spent impingement cooling air exits shroud segment 130 through cooling holes 194 defined at or near trailing edge 137 of shroud segment 130.

In the flow path illustrated in FIG. 3, high pressure turbine section active convection cooling zone 173 and low pressure turbine section active convection cooling zone 186 are directly and actively cooled. However, unlike active convection cooling zone 84 (shown in FIG. 2) of conventional shroud assembly 10 (shown in FIG. 1), low pressure turbine section inactive convection cooling zone 211 is inactive, i.e., no high pressure cooling air flows through inactive convection cooling zone 211. Thus, a thermal response within inactive convection cooling zone 211 to environmental conditions created during transient engine operation is reduced and/or retarded. As a result, transient displacement of midsection position control ring 162 and/or aft position control ring 164 is also reduced and/or retarded.

In the alternative embodiment shown in FIG. 4, high pressure cooling air 170 is directed into duct 204 defined at least partially between high pressure turbine nozzle outer band 183 and shroud ring structure 158 forming midsection position control ring 162. High pressure cooling air 170 is separated into first portion 171 and second portion 172. First portion 171 of high pressure cooling air 170 is metered through HPTS feed hole(s) 174 into high pressure turbine section active convection cooling zone 173 at least partially defining plenum 176 and plenum 178 to facilitate shroud segment impingement cooling in high pressure turbine section 112. Spent impingement cooling air 180 exits shroud segment 130 through shroud segment leading edge cooling holes 181 to facilitate purging gap 182 between high pressure turbine nozzle outer band 183 and shroud segment 130 and/or through cooling holes 185 defined at trailing end 205 of high pressure turbine section 112 to facilitate film cooling inner surface 140.

Second portion 172 of high pressure cooling air 170 is directed into low pressure turbine section active convection cooling zone 186 defined at least partially between shroud support 144 and shroud segment 130, and between midsection position control ring 162 and aft position control ring 164 to facilitate cooling low pressure turbine section 114. In one embodiment, second portion 172 of high pressure cooling air 170 is metered through a plurality of low pressure turbine feed holes 187 defined through shroud support 144. Second portion 172 of high pressure cooling air 170 is metered directly into low pressure turbine section active convection cooling zone 186 at least partially defining plenum 189 and plenum 191 to facilitate shroud segment cooling in low pressure turbine section 114. Spent impingement cooling air 193 exits shroud segment 130 through cooling holes 194 defined at or near trailing edge 137 of shroud segment 130.

In contrast to conventional shroud cooling assemblies in which the high pressure cooling air is fed through active convection cooling zone 84, the shroud cooling assembly as shown in FIGS. 3 and 4 directs high pressure cooling air directly into high pressure turbine section active convection cooling zone 173 and low pressure turbine section active convection cooling zone 186 through respective feed hole(s) 174 and feed hole(s) 187.

In the shroud cooling assembly as shown in FIGS. 3 and 4, high pressure cooling air is not metered or directed through low pressure turbine section inactive convection cooling zone 211. As a result, the components defining low pressure turbine section inactive convection cooling zone 211 respond relatively slower to thermal conditions and/or environments during transient engine operation than the components defining active convection cooling zone 84 within conventional shroud cooling assemblies, shown in FIG. 1. This slower response to thermal conditions and/or environments facilitates relatively slower transient displacement of midsection position control ring 162 and/or aft position control ring 164.

Thus, by bypassing the low pressure turbine section shroud ring structure, the high pressure cooling air flow paths shown in FIGS. 3 and 4 facilitate reducing and/or retarding the transient thermal response and/or displacement of the shroud segment during transient engine operation. The slower response further facilitates improved blade tip clearance and turbine engine efficiency.

The above-described method and system for providing high pressure cooling air through a turbine shroud assembly facilitates cooling a turbine shroud assembly in an efficient and reliable manner. Further, the above-described method and system facilitates reducing transient displacement of the position control rings for the shroud assembly. More specifically, the method and system meters high pressure cooling air through the shroud assembly while bypassing the LP shroud ring structure to facilitate reducing and/or retarding a shroud segment thermal response during transient engine operation. As a result, a shroud segment transient displacement is reduced and/or retarded. The reduced and/or retarded shroud segment thermal response facilitates improved turbine blade clearance and turbine engine efficiency.

Exemplary embodiments of a method and system for providing high pressure cooling air through a turbine shroud assembly are described above in detail. The method and system are not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and system as described herein.

While the invention has been described in terms of various specific embodiments, those skilled in the art will recognize that the invention can be practiced with modification within the spirit and scope of the claims.

What is claimed is:

1. A method for cooling a turbine shroud assembly, said method comprising:
   providing a turbine shroud assembly comprising a shroud segment having a leading edge, a trailing edge and a midsection defined therebetween, a shroud support circumferentially spanning and supporting the shroud segment, the shroud support comprising a forward hanger coupled to the leading edge, a midsection hanger coupled to the midsection and an aft hanger coupled to the trailing edge, and an annular shroud ring structure comprising less than three position control rings, the less than three position control rings including a midsection position control ring coupled to the midsection hanger and an aft position control ring coupled to the aft hanger;
   extracting cooling air from a compressor positioned upstream of the turbine shroud assembly; and
   metering cooling air through the shroud support directly into only at least one active convection cooling zone defined between the shroud segment and the shroud support.

2. A method in accordance with claim 1 further comprising substantially preventing cooling air from entering an inactive convection cooling zone positioned radially outwardly from the at least one active convection cooling zone and defined between the shroud support and the shroud ring structure and between the midsection position control ring and the aft position control ring.

3. A method in accordance with claim 1 wherein metering cooling air further comprises:
   metering a first portion of cooling air into a first active convection cooling zone defined between the shroud segment and the shroud support and between the forward hanger and the midsection hanger through at least one first feed hole defined in the shroud support; and
   metering at least a portion of the first portion of cooling air through a plurality of forwardly directed cooling holes defined in the leading edge to facilitate purging a gap defined between a high pressure turbine nozzle outer band positioned upstream of the turbine shroud assembly and the leading edge.

4. A method in accordance with claim 3 further comprising metering a portion of the first portion of cooling air through a plurality of rearwardly directed cooling holes defined in the shroud segment to facilitate film cooling a downstream portion of the shroud segment.

5. A method in accordance with claim 3 wherein metering cooling air further comprises:
   metering a second portion of cooling air into a second active convection cooling zone defined between the shroud segment and the shroud support and between the midsection hanger and the aft hanger through at least one second feed hole defined in the shroud support; and
   metering the second portion of cooling air through a plurality of rearwardly directed cooling holes defined in the trailing edge of the shroud segment to facilitate film cooling said trailing edge.

6. A method in accordance with claim 5 further comprising impinging the second portion of cooling air against a backside of the shroud segment as the second portion of cooling air is metered into the second active convection cooling zone.

7. A turbine shroud assembly for a gas turbine engine, said turbine shroud assembly comprising:
   a shroud segment comprising a leading edge, a trailing edge and a midsection defined therebetween, said shroud segment comprising a forward mounting hook at said leading edge, a midsection mounting hook at said midsection and an aft mounting hook at said trailing edge;
   a shroud support circumferentially spanning and supporting said shroud segment, said shroud support comprising a forward section, a midsection and an aft section, said forward section forming a forward hanger coupled to said forward mounting hook, said midsection forming a midsection hanger coupled to said midsection mounting hook, said aft section forming an aft hanger coupled to said aft mounting hook;

an annular shroud ring structure configured to support said shroud support, said annular shroud ring structure comprising less than three position control rings, the less than three position control rings including a midsection position control ring coupled to said midsection hanger and an aft position control ring coupled to said aft hanger;

a first active convection cooling zone defined between said shroud segment and said shroud support and between said forward mounting hook and said midsection mounting hook;

at least one feed hole extending through said shroud support and configured to meter a first portion of cooling air into said first active convection cooling zone; and a first inactive convection cooling zone defined between said shroud support and said annular shroud ring structure and between said midsection position control ring and said aft position control ring, said shroud support substantially preventing cooling air from entering said first inactive convection cooling zone.

8. A turbine shroud assembly in accordance with claim 7 further comprising a plurality of forwardly directed cooling holes defined in said leading edge and configured to meter an amount of cooling air exiting said first active convection cooling zone to facilitate purging a gap defined at least partially by said leading edge.

9. A turbine shroud assembly in accordance with claim 7 further comprising a plurality of rearwardly directed cooling holes defined in said shroud segment and configured to meter an amount of cooling air exiting said first active convection cooling zone to facilitate film cooling a downstream portion of said shroud segment.

10. A turbine shroud assembly in accordance with claim 7 further comprising an impingement baffle positioned within said first active convection cooling zone, said impingement baffle comprises an upper plenum and a lower plenum, said impingement baffle defining a plurality of perforations configured to meter the first portion of cooling air into said lower plenum.

11. A turbine shroud assembly in accordance with claim 10 wherein said plurality of perforations are configured to facilitate impingement cooling a backside of said shroud segment.

12. A turbine shroud assembly in accordance with claim 7 further comprising:

a second active convection cooling zone defined between said shroud segment and said shroud support and between said midsection mounting hook and said aft mounting hook;

at least one feed hole extending through said shroud support and configured to meter a second portion of cooling air into said second active convection cooling zone; and a plurality of rearwardly directed cooling holes defined in said trailing edge and configured to meter an amount of cooling air exiting said second active convection cooling zone to facilitate film cooling a portion of said trailing edge.

13. A turbine shroud assembly in accordance with claim 7 wherein said midsection position control ring is axially aligned with said midsection mounting hook, said aft position control ring is axially aligned with said aft mounting hook.

14. A turbine shroud cooling system for providing cooling air through a turbine shroud assembly to facilitate cooling the turbine shroud assembly, the turbine shroud assembly comprising a shroud segment having a leading edge, a trailing edge and a midsection defined therebetween, a shroud support circumferentially spanning and supporting the shroud segment, the shroud support comprising a forward hanger coupled to the leading edge, a midsection hanger coupled to the midsection and an aft hanger coupled to the trailing edge, and a shroud ring structure comprising less than three position control rings, the less than three position control rings including a midsection position control ring coupled to the midsection hanger and an aft position control ring coupled to the aft hanger, said turbine shroud cooling system configured to:

direct cooling air into a duct defined at least partially between a high pressure turbine nozzle outer band positioned upstream of the turbine shroud assembly and the shroud ring structure; and meter cooling air through the shroud support directly into only at least one active convection cooling zone defined between the shroud segment and the shroud support to facilitate shroud segment cooling.

15. A turbine shroud cooling system in accordance with claim 14 further configured to prevent cooling air from entering an inactive convection cooling zone defined between the shroud support and the shroud ring structure and between the midsection position control ring and the aft position control ring.

16. A turbine shroud cooling system in accordance with claim 14 further configured to meter a first portion of cooling air through a plurality of first feed holes into a first active convection cooling zone defined between the shroud segment and the shroud support and between the forward hanger and the midsection hanger to facilitate shroud segment impingement cooling in a high pressure turbine section of the turbine shroud assembly.

17. A turbine shroud cooling system in accordance with claim 16 further configured to meter spent impingement cooling air through a plurality of cooling holes defined in the shroud segment at the leading edge to facilitate purging a gap between the high pressure turbine nozzle outer band and the shroud segment.

18. A turbine shroud cooling system in accordance with claim 16 further configured to meter a portion of spent impingement cooling air through a plurality of cooling holes defined in the shroud segment to facilitate film cooling a downstream portion of the shroud segment.

19. A turbine shroud cooling system in accordance with claim 16 further configured to meter a second portion of cooling air through a plurality of second feed holes defined in the shroud support into a second active convection cooling zone defined between the shroud segment and the shroud support and between the midsection hanger and the aft hanger to facilitate shroud segment impingement cooling in a low pressure turbine section of the turbine shroud assembly.

20. A turbine shroud cooling system in accordance with claim 19 further configured to meter spent impingement cooling air exiting the shroud segment through a plurality of cooling holes defined at the trailing edge of the shroud segment.

* * * * *